United States Patent
Cox

(10) Patent No.: US 9,741,098 B2
(45) Date of Patent: Aug. 22, 2017

(54) SYSTEM AND METHOD FOR OPTIMIZING IMAGE QUALITY IN A DIGITAL CAMERA

(71) Applicant: NVIDIA Corporation, Santa Clara, CA (US)

(72) Inventor: Michael Brian Cox, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 477 days.

(21) Appl. No.: 13/651,342

(22) Filed: Oct. 12, 2012

(65) Prior Publication Data

US 2014/0104450 A1   Apr. 17, 2014

(51) Int. Cl.
*H04N 5/228* (2006.01)
*G06T 5/00* (2006.01)
*G06T 1/20* (2006.01)
*G06N 3/08* (2006.01)

(52) U.S. Cl.
CPC ............ *G06T 5/00* (2013.01); *G06T 1/20* (2013.01); *G06N 3/08* (2013.01); *G06T 2207/20081* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 5,465,308 A * | 11/1995 | Hutcheson | ......... | G06K 9/00221 382/156 |
| 5,694,224 A * | 12/1997 | Tai | ......... | H04N 1/407 358/3.01 |
| 6,356,646 B1 * | 3/2002 | Spencer | ......... | G06K 9/0063 348/144 |
| 6,400,841 B1 * | 6/2002 | Khoury | ......... | G06T 7/0004 345/419 |
| 7,266,229 B2 * | 9/2007 | Couwenhoven | ......... | G06T 5/004 382/132 |
| 7,321,674 B2 * | 1/2008 | Vuylsteke | ......... | G06T 5/009 382/128 |
| 7,372,595 B1 * | 5/2008 | Lyon | ......... | H04N 1/00132 358/1.9 |
| 8,287,281 B2 * | 10/2012 | Karkanias | ......... | G09B 7/02 434/236 |
| 8,452,110 B2 * | 5/2013 | Carmel | ......... | H04N 19/176 382/232 |
| 8,477,246 B2 * | 7/2013 | Saxena | ......... | G11B 27/034 345/632 |
| 8,565,554 B2 * | 10/2013 | Lu | ......... | G06T 3/4007 345/441 |
| 8,908,984 B2 * | 12/2014 | Carmel | ......... | H04N 19/176 375/240.13 |

(Continued)

FOREIGN PATENT DOCUMENTS

TW   201233158 A   8/2012

*Primary Examiner* — Kakali Chaki
*Assistant Examiner* — Fuming Wu
(74) *Attorney, Agent, or Firm* — Artegis Law Group, LLP

(57) ABSTRACT

A digital camera includes an image optimization engine configured to generate an optimized image based on a raw image captured by the digital camera. The image optimization engine implements one or more machine learning engines in order to select rendering algorithms and rendering algorithm arguments that may then be used to render the raw image.

25 Claims, 11 Drawing Sheets

(56) References Cited

U.S. PATENT DOCUMENTS

| | | | | |
|---|---|---|---|---|
| 2002/0194161 A1* | 12/2002 | McNamee | G06F 17/30864 | |
| 2003/0035653 A1* | 2/2003 | Lyon | H04N 1/00132 | |
| | | | | 396/429 |
| 2004/0120561 A1* | 6/2004 | Goto | G06T 7/0012 | |
| | | | | 382/128 |
| 2005/0069207 A1* | 3/2005 | Zakrzewski | B64D 45/0015 | |
| | | | | 382/190 |
| 2007/0189603 A1* | 8/2007 | Kasperkiewicz | G06T 1/20 | |
| | | | | 382/162 |
| 2008/0089581 A1* | 4/2008 | Pitie | H04N 1/60 | |
| | | | | 382/162 |
| 2008/0095306 A1* | 4/2008 | Jensen | A61B 6/465 | |
| | | | | 378/10 |
| 2009/0309894 A1* | 12/2009 | Lam | G06F 17/211 | |
| | | | | 345/582 |
| 2010/0086182 A1* | 4/2010 | Luo | G06T 5/00 | |
| | | | | 382/128 |
| 2010/0268223 A1* | 10/2010 | Coe | A61B 18/1477 | |
| | | | | 606/41 |
| 2011/0044537 A1* | 2/2011 | Cobb | G06K 9/00771 | |
| | | | | 382/165 |
| 2011/0142335 A1* | 6/2011 | Ghanem | G06F 17/3025 | |
| | | | | 382/165 |
| 2011/0222786 A1* | 9/2011 | Carmel | H04N 19/176 | |
| | | | | 382/224 |
| 2011/0274361 A1* | 11/2011 | Bovik | G06K 9/00664 | |
| | | | | 382/224 |
| 2012/0081385 A1* | 4/2012 | Cote | G09G 5/02 | |
| | | | | 345/589 |
| 2012/0147176 A1* | 6/2012 | Zhang | G06K 9/00805 | |
| | | | | 348/118 |
| 2014/0104450 A1* | 4/2014 | Cox | G06T 1/20 | |
| | | | | 348/222.1 |
| 2014/0152848 A1* | 6/2014 | Cox | H04N 17/002 | |
| | | | | 348/207.1 |

* cited by examiner

SYSTEM AND METHOD FOR OPTIMIZING IMAGE QUALITY IN A DIGITAL CAMERA

BACKGROUND OF THE INVENTION

Field of the Invention

The present invention generally relates to digital photography, and, more specifically, to a system and method for optimizing image quality in a digital camera.

Description of the Related Art

The popularity of digital photography has skyrocketed over the past decade, primarily due to the inclusion of digital cameras in mobile devices such as cell phones. As digital camera technology improves, resulting in an increase of digital image resolution, an increasing number of people have come to rely entirely on cell phone-based digital cameras for all photography needs. Users want the ability to snap quick photos that have professional quality, and, consequently, most modern digital cameras now include image signal processors (ISPs) that implement numerous image processing algorithms and can be used to improve the quality of digital images.

Typically the acquisition into the camera of images from a sensor is called "image capture" and the process of applying image processing algorithms to the raw images to produce optimized images is called "image rendering". Algorithms that provide such processing are called "rendering algorithms" and include but are not limited to noise reduction, automatic white balance adjustment, tone correction, sharpening, color enhancement, etc. Typically the precise operation of each rendering algorithm is controlled by specific arguments. For example, a color saturation algorithm may be controlled by an argument which is the percentage of saturation above or below some standard value. These algorithms may be implemented entirely in hardware, in firmware on Digital Signal Processors, in special code on programmable engines like a Graphics Processing Unit (GPU), or in software or some combination of the above.

Each such algorithm is typically designed and implemented by an algorithm designer manually based on the designer's experience with computational photography. As such, many designers have become experts in narrow fields related to image quality. For example, a given designer may be considered an expert in designing algorithms for "noise reduction" or for controlling "white balance." Given the vast number of algorithms required to produce high quality images, and the varied issues in processing raw images from digital sensors, many digital camera vendors employ an army of algorithm designers, where each designer has extensive experience designing and tuning algorithms to correct for or enhance one highly specific issue. In many cases, these algorithms require input from a user of the digital camera in order to function properly. For example, a given algorithm may require information describing the type of scene a user wishes to photograph, such as "beach" or "forest." The algorithm then adjusts certain parameters according to this user-provided information.

One problem with the current state of digital photography is that digital camera vendors typically invest a large amount of time and money designing algorithms to be included in ISPs, and nonetheless, many digital cameras still require significant user interaction to produce images of reasonable quality. This arrangement is less than ideal because, despite this large investment of time and money in ISP development, most digital camera vendors still fall short of producing high-quality images with the "point and shoot" functionality that users desire.

Accordingly, what is needed in the art is a more effective technique for implementing image processing algorithms in a digital camera.

In another line of technology development, a rich set of Machine Learning techniques has been developed that enables a Machine Learning Engine (MLE) to be trained to implement arbitrarily complicated functions and algorithms. Using techniques such as Supervised Learning, an MLE such as an Artificial Neural Network (ANN), or Support Vector Machine (SVM), or one of numerous other MLE's, can be trained to categorize new as yet unseen data. An MLE can also be trained to implement a transformation from new as yet unseen input into output that closely matches the desired ideal output as represented by the training data.

SUMMARY OF THE INVENTION

One embodiment of the present invention sets forth a method for rendering an image, including capturing a raw image via an optical sensor included in a digital camera, generating a set of image statistics for the raw image based on a set of pixel values associated with the raw image, causing a first machine learning engine to select a rendering algorithm and a set of rendering algorithm arguments that correspond to the selected rendering algorithm; and rendering the optimized image by processing the raw image with the rendering algorithm and the set of rendering algorithm arguments.

An advantage of the techniques described herein is that the machine learning engine within the image optimization engine may be trained to generate images without requiring a team of designers to produce and tune a large collection of algorithms. Further, the user of the digital camera can achieve superior optimized images with less manual camera control, thereby improving user experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
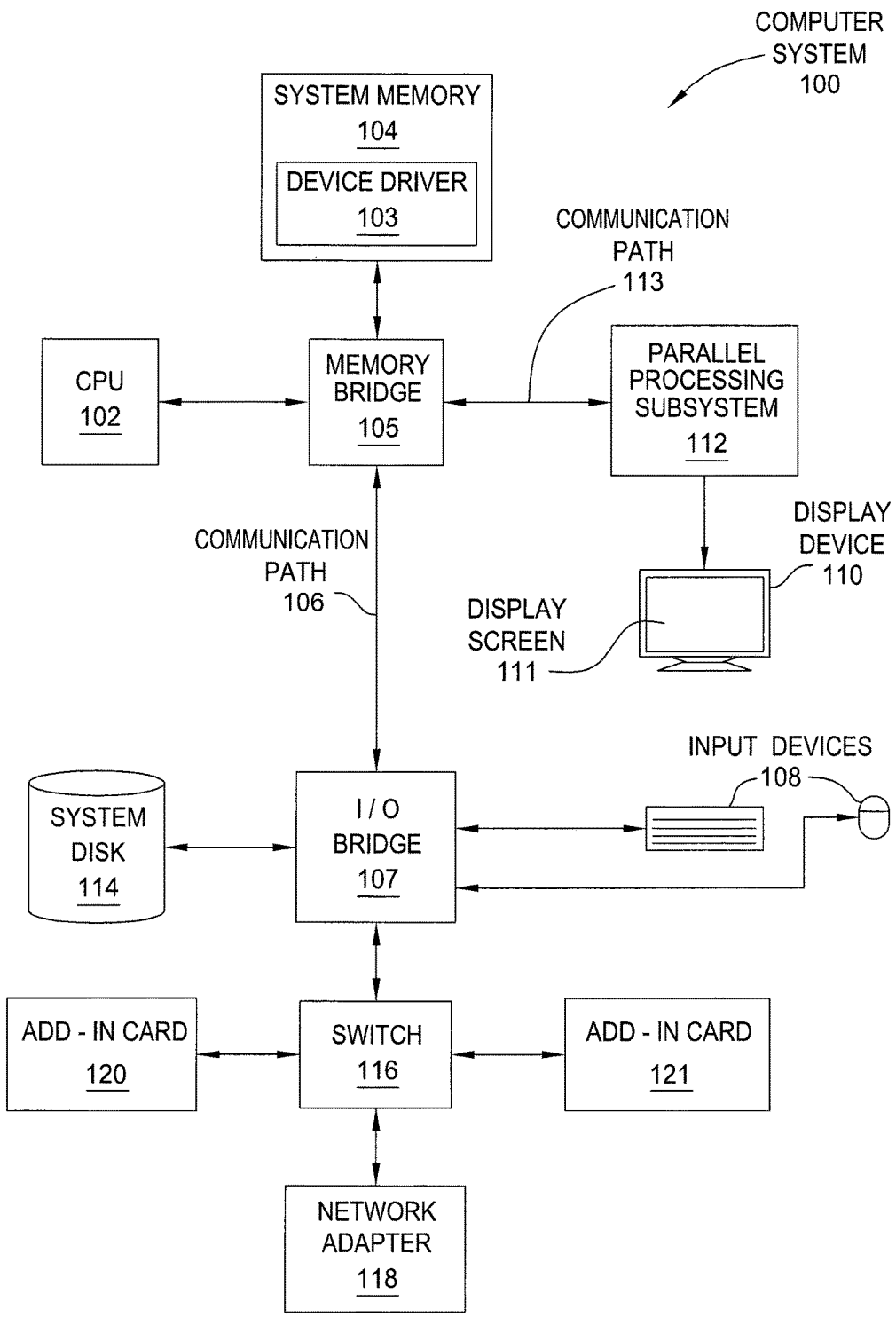
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
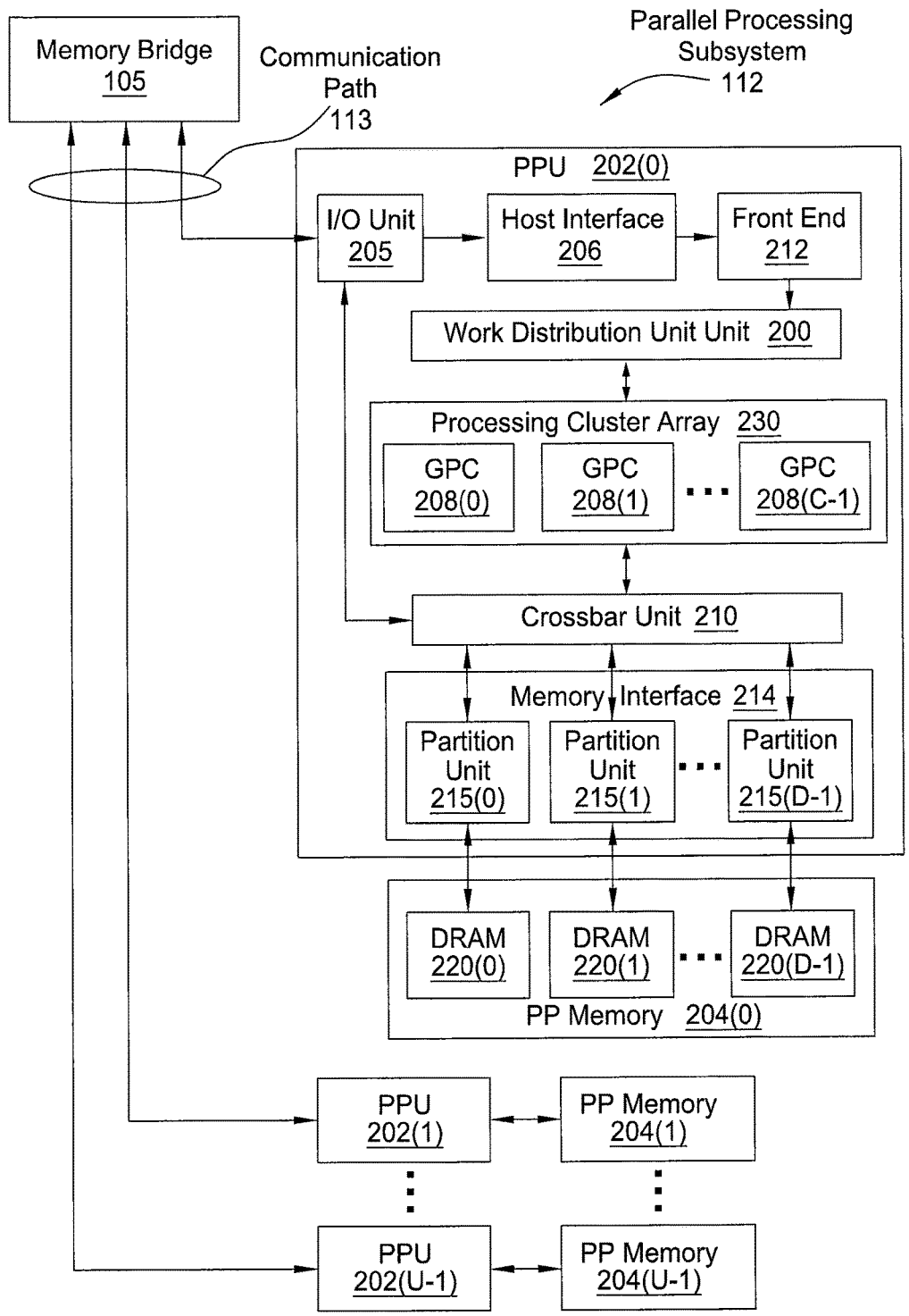
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Optimizing Digital Images

Figure 3:
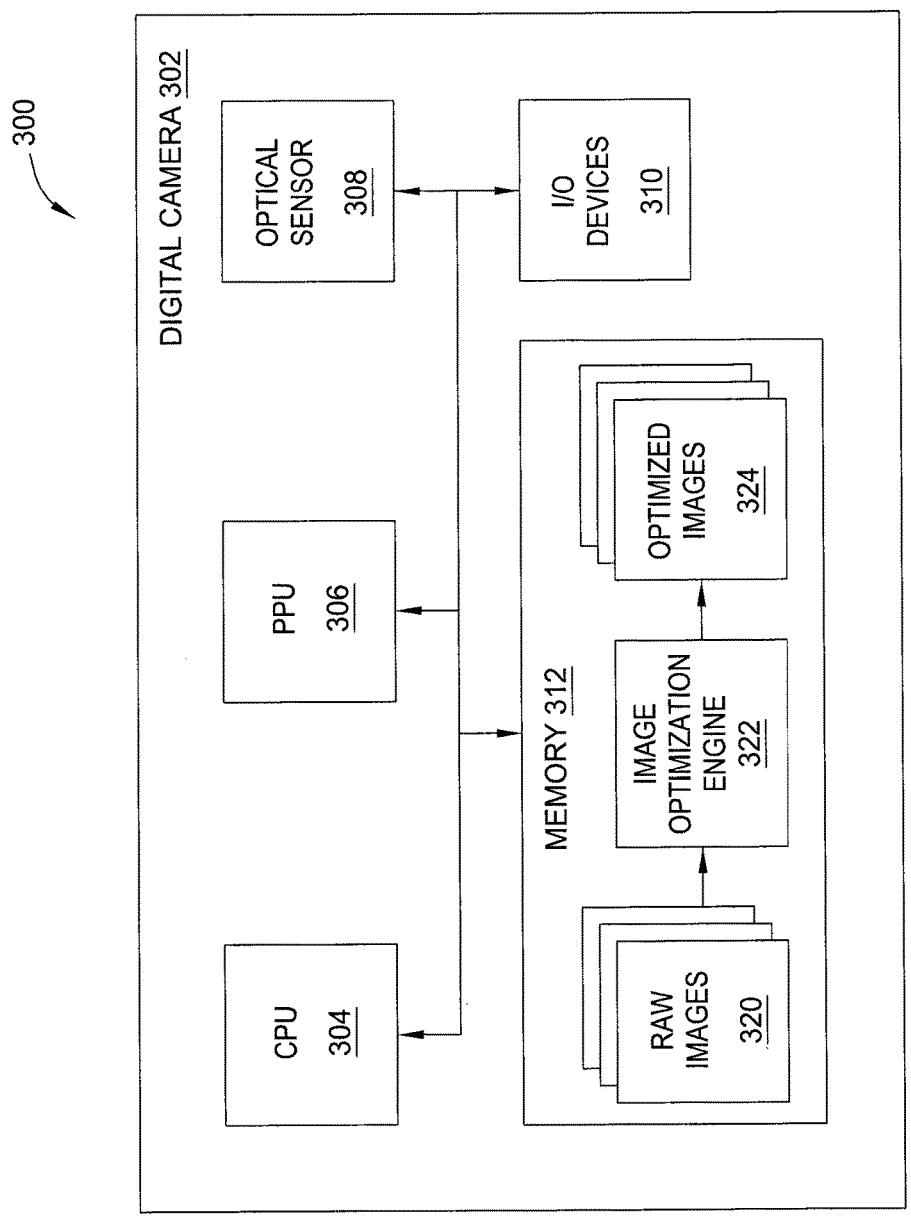
FIG. 3 is a block diagram that illustrates a digital camera, according to one embodiment of the present invention.

FIG. 3 is a block diagram 300 that illustrates a digital camera 302, according to one embodiment of the present invention. Digital camera 302 may be included within mobile devices, such as cell phones or tablet computers, or may represent a device dedicated to digital photography. By operating digital camera 302, a user may capture digital images. As shown, digital camera 302 includes a CPU 304, a PPU 306, an optical sensor 308, a memory 312, and input/output (I/O) devices 310. CPU 304 may be substantially similar to CPU 102 shown in FIG. 1, while PPU 306 may be substantially similar to PPU 202 shown in FIG. 2.

Optical sensor 308 is configured to receive light waves and to output an electrical signal that represents the color and intensity of those light waves, among other things. Optical sensor 308 could be, for example, a color filter array (CFA) or a charge-coupled device (CCD), among others. I/O devices 310 may include input devices, such as a keypad, touchpad, a microphone, a shutter-release button, and so forth, as well as output devices, such as a screen, a speaker, one or more light-emitting diodes (LEDs), and so forth. In addition, I/O devices 310 may include devices capable of performing both input and output operations, such as a touch screen, an Ethernet port, a universal serial bus (USB) port, a serial port, etc. CPU 304, PPU 306, optical sensor 308, and I/O devices 310 are coupled together and coupled to memory 312.

Memory 312 could be any type of unit capable of storing data, including random-access memory (RAM), read-only memory (ROM), one or more hardware/software registers, a buffer, and so forth. As shown, memory 312 includes raw images 320, an image optimization engine 322, and optimized images 324. When a user of digital camera 302 wishes to capture a digital image, the user manipulates I/O devices 310 in order to cause optical sensor 308 to receive light waves (i.e. the user may press a shutter-release button to "take a picture"). Optical sensor 308 then causes a representation of the captured light waves to be written to memory 312 as one or more of raw images 320. CPU 304 and/or PPU 306 may participate in processing the signals generated by optical sensor 308 to produce raw images 320.

Image optimization engine (IOE) 322 may then process raw images 320 to render optimized images 324. IOE 322 may be a software program residing in memory 312, as is shown, and may be executed by CPU 304 and/or PPU 306 in order to process raw images 320. Alternatively, IOE 322 may be a hardware unit embedded within digital camera 302 and coupled to CPU 304/PPU 306, optical sensor 308, memory 312, and I/O devices 310. As described in greater detail below in conjunction with FIGS. 4-9, IOE 322 may implement various different techniques processing raw images 320 to produce optimized images 324.

Figure 4A:
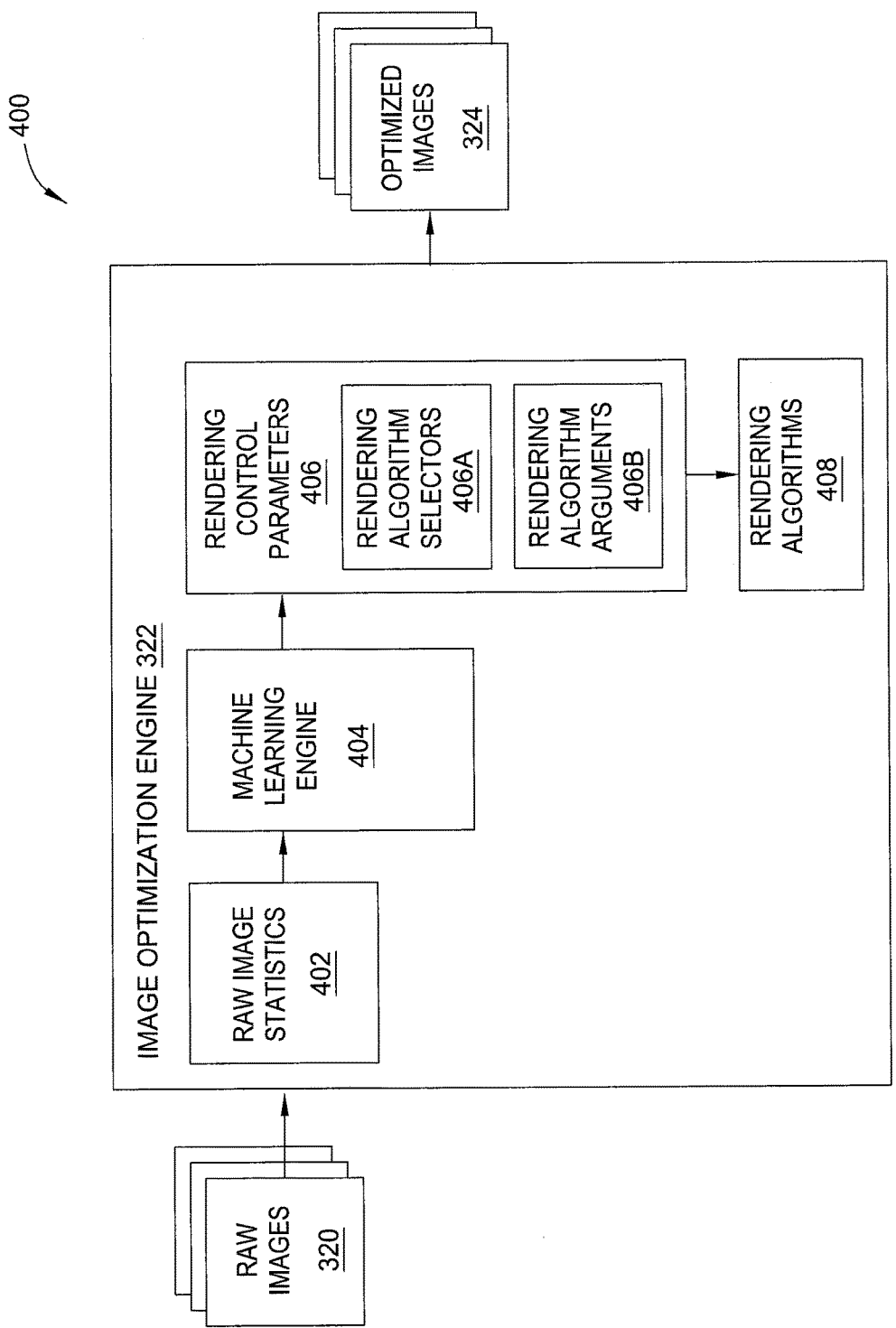
FIG. 4A is a conceptual diagram that illustrates an image optimization engine configured to process digital images, according to one embodiment of the present invention.

FIG. 4A is a conceptual diagram 400 that illustrates one embodiment of IOE 322 shown in FIG. 3. As shown, conceptual diagram 400 includes raw images 320, IOE 322, and optimized images 324, also shown in FIG. 3. As mentioned above, IOE 322 is configured to generated optimized images 324 by processing raw images 320.

For a given raw image 320, IOE 322 first generates raw image statistics 402. Raw image statistics 402 may include different values, where each value corresponds to a different statistic that may be computed for a given image. Raw image statistics 402 may include a wide variety of different statistics, including quantities that represent color distribution, luminance distribution, contrast, saturation, exposure, and/or other statistics associated with images.

IOE 322 is configured to process a raw image 302 and raw image statistics 402 using machine learning engine (MLE) 404. MLE 404 implements one or more machine learning algorithms that may generally be used to compute one or more output values based on one or more input values. MLE 404 may incorporate a decision tree, an artificial neural network (ANN), a Bayesian network, a combination of different machine learning algorithms, and so forth, and may be trained using one or more supervised learning techniques, as discussed in greater detail below. IOE 322 implements MLE 404 in order to generate a set of rendering control parameters 406 based the raw image statistics 402 and optionally on the raw image 302.

One subset of the rendering control parameters 406 comprises rendering algorithm selectors 406A each of which corresponds to a different rendering algorithm 408, and the remainder of the rendering control parameters 406 comprise rendering algorithm arguments 406B to be provided to the rendering algorithms 408. IOE 322 selects the algorithms 408 corresponding to the rendering algorithm selectors 406A, and then applies the selected algorithms with specified parameters 406B to the raw image in order to render an optimized image. IOE 322 may repeat this process for each one of the raw images 320 in order to render optimized images 324. In one embodiment, IOE 322 processes a given raw image 320 using the raw image statistics 402 associated with that image as well as using raw image statistics associated with previous and/or subsequent images.

As mentioned above, MLE 404 is configured to implement one or more machine learning algorithms and may be trained by implementing one or more supervised learning techniques, as described in greater detail below in conjunction with FIG. 4B.

Figure 4B:
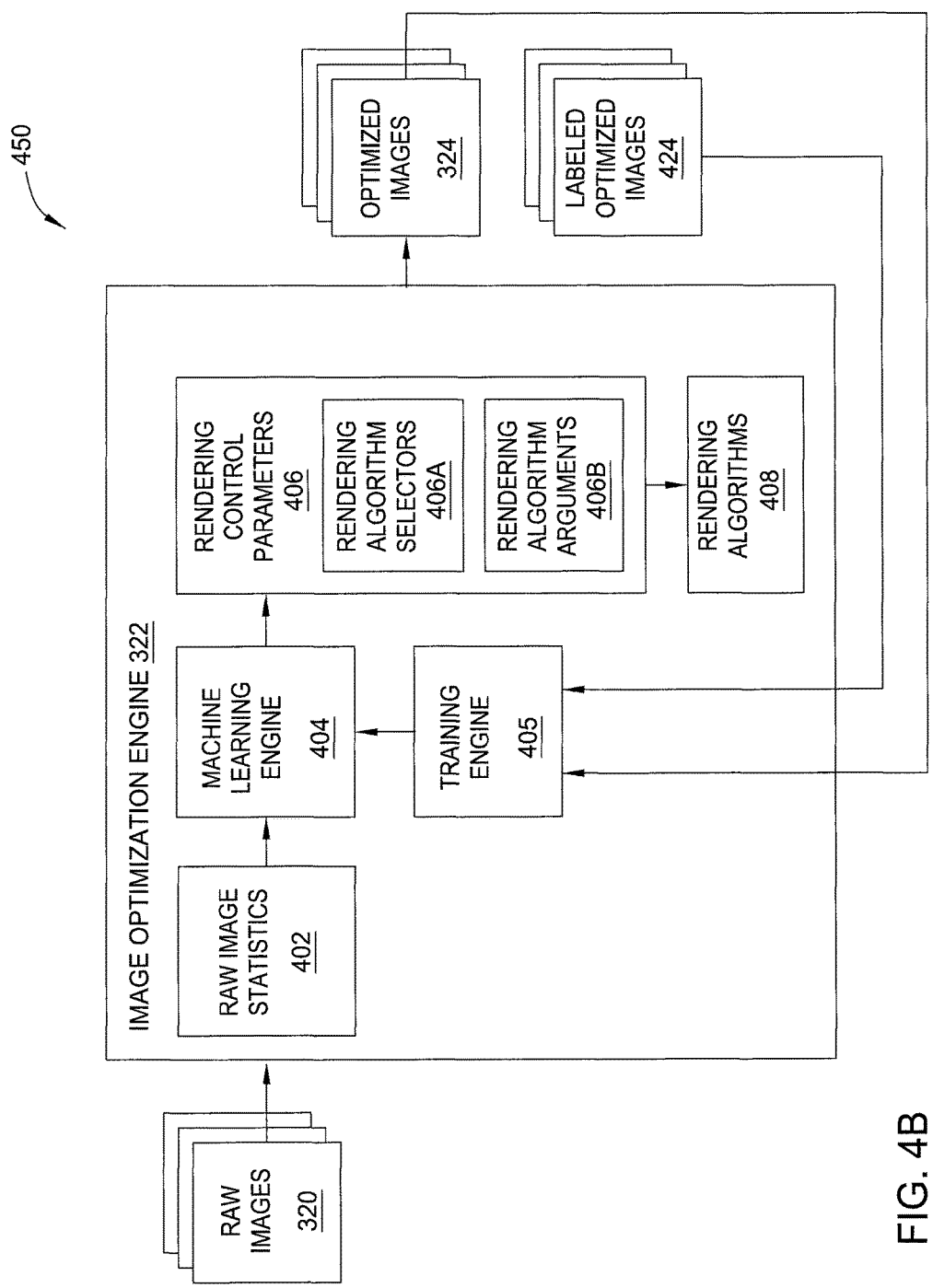
FIG. 4B is a conceptual diagram that illustrates training the image optimization engine shown in FIG. 4A, according to one embodiment of the present invention.

FIG. 4B is a conceptual diagram 450 that illustrates a technique for training MLE 404, according to one embodiment of the present invention. For each raw image 320 an "ideal" labeled optimized image 424 is provided that is used to train the MLE 404. As shown, for each raw image 320, raw image statistics 402 are generated and these optionally in combination with the raw images are provided to the MLE 404. MLE 404 is initialized with a collection of values that may be random or more carefully selected in a way consistent with the state of the art of Machine Learning. The MLE 404 generates the rendering algorithm selectors 406A that are then used to select the rendering algorithms 408 and also generates the rendering algorithm arguments 406B that are provided to these algorithms. The algorithms 408 render an optimized image 324 that is then compared with the "ideal" optimized image 424 that is desired to be rendered from the raw image 320. A training engine 405 then computes the deviation of the optimized image 324 from labeled optimized image 424, and based on that deviation, computes improved parameters for the MLE 404. MLE 404 may then generate improved rendering control parameters 406.

The process outlined above is iterated until the deviation computed by training engine 405 is less than some desired tolerance, at which time the optimized images 324 that result from the rendering control parameters 406 are close to the "ideal" labeled optimized images 424. For example, this process may be applied to train MLE 404 to select the tone mapping curve that will result in rendering the optimized images 324 closest to the "ideal" labeled optimized images in the training set 424, so that when a given raw image 320 that is not in the training set is provided to MLE 404, MLE 404 will produce rendering control parameters 406 that will generate an optimized image that is similar to an "ideal" optimized image.

In one embodiment, the labeled optimized images 424 are generated manually, i.e. by collecting human-generated ratings of images produced by alternative rendering control parameters 406. In another embodiment, MLE 404 may be trained on an ongoing basis by receiving input from a user of digital camera 302 that represents the perceived quality of an optimized image 324 generated using a given set of rendering control parameters 406. By repeating this process for different rendering control parameters for different raw images, training engine 405 may adjust the weight values associated with MLE 404 in order to more effectively choose the rendering algorithm selectors 406A and rendering algorithm arguments 406B. In this fashion, MLE 404 may be trained to predict the preferences of a user.

Figure 5A:
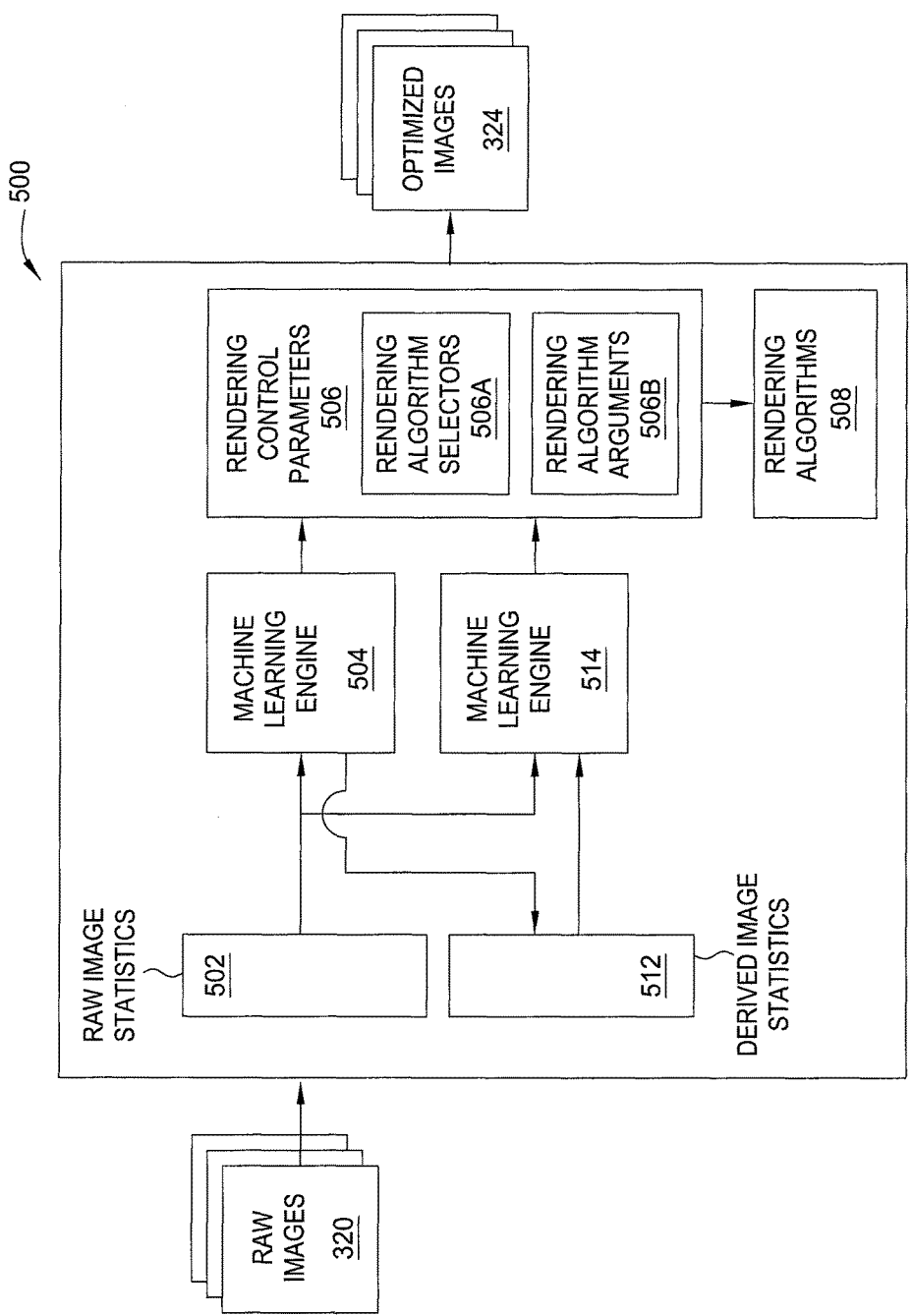
FIG. 5A is a conceptual diagram that illustrates another embodiment of image optimization engine shown in FIG. 3, according to one embodiment of the present invention.

In one embodiment, the MLE 404 is trained in situ in the Digital Camera 302. In another embodiment, the MLE 404 is trained offline on a Computer System 100 or Parallel Processing Subsystem 112, and this trained MLE 404 implemented in the Digital Camera 302. In yet another embodiment, MLE 404 is trained on an ongoing basis on a computing system located remotely, i.e. a cloud-based computing system. By implementing the techniques described above, the quality of output images rendered by digital camera 302 may be significantly improved. FIG. 5A outlines another technique for improving image quality.

FIG. 5A is a conceptual diagram 500 that illustrates another embodiment of IOE 322 shown in FIG. 3, according to one embodiment of the present invention. As shown, IOE 322 is configured to render optimized images 324 based on raw images 322. IOE 322 is configured to generate raw image statistics 502 for a given raw image 320 in like fashion as described in conjunction with FIGS. 4A-4B. Accordingly, raw image statistics may be substantially similar to raw image statistics 402 shown in FIGS. 4A-4B. IOE 322 is configured to process raw image statistics 502 and optionally raw images 320 using MLE 504 in order to generate derived image statistics 512. Derived image statistics 512 represent statistics that may be inferred based on raw image statistics 502, and may represent qualities of a raw image, such as type of scene (e.g. "beach," "forest," etc.), depth of focus, and so forth. In general, derived image statistics 512 represent properties of the external environment.

Figure 5B:
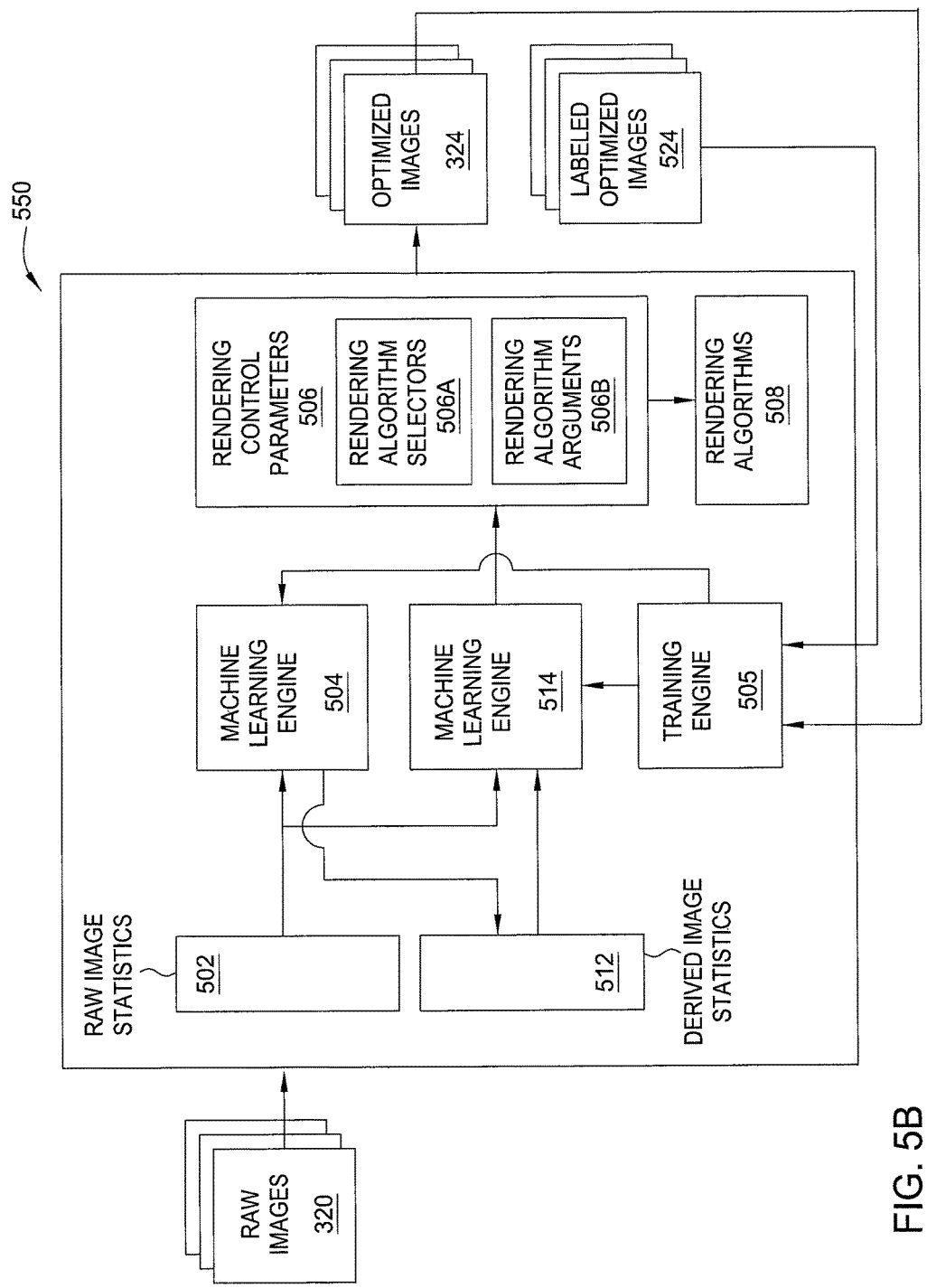
FIG. 5B is a conceptual diagram that illustrates training the image optimization engine shown in FIG. 5A, according to one embodiment of the present invention.

MLE 504 may be substantially similar to MLE 404 shown in FIGS. 4A-4B, and as such, may be implemented using a number of different machine learning algorithms and may be trained to generate derived image statistics 512 by applying a variety of different supervised learning techniques. FIG. 5B is a conceptual diagram 550 that illustrates the method of training MLE 504 according to one embodiment of the present invention. For each raw image 320 an "ideal" labeled optimized image 524 is provided that is used to train the MLE 504. As shown, for each raw image 320, raw image statistics 502 are generated and these optionally in combination with the raw images are provided to the MLE 504 that is initialized essentially similar to the way in which MLE 404 is initialized in FIG. 4A. The MLE 504 calculates the derived statistics 512 that are then provided to MLE 514, which based upon the raw image statistics 502 and optionally raw image 320 and derived statistics 512, calculates the rendering control parameters 506, which in turn choose the algorithm 508 and provide its input arguments. The algorithm as before calculates an optimized image 324 that is compared with the labeled "ideal" optimized image 524, and its output is provided to the MLE 504 and the process iterated until the optimized images 324 are as close as desired to the "ideal" optimized images 524.

Once derived image statistics 512 have been generated by MLE 504, those statistics, as well as raw images 320 and raw image statistics 502, are processed by MLE 514 in order to generate the rendering control parameters 506. Similar to the rendering control parameters 406 shown in FIG. 4, each of rendering algorithm selectors 506A is a value that corresponds to a rendering algorithm 508, and each of rendering algorithm arguments 506B is provided as input to the selected rendering algorithms 508. In like fashion as described in conjunction with FIG. 4A, IOE 322 selects the algorithms 508 and provides their arguments, and then applies the algorithms to the raw image in order to render an optimized image. IOE 322 may repeat this process for each one of raw images 320 in order to generate optimized images 324.

MLE 514 may be substantially similar to MLE 404 shown in FIGS. 4A-4B and MLE 504, and as such, may be implemented using a number of different machine learning algorithms and may be trained to generate rendering control parameters 506 by applying a variety of different supervised learning techniques. For example, MLE 514 could be trained using a set of "example" raw images 320 with corresponding "ideal" labeled optimized images 524. For each raw image 320, both raw statistics 502 as well as derived statistics 512 are generated and provided as input to MLE 514, which generates rendering control parameters 506 that select algorithms 508 and provide their input, subsequently generating optimized image 324. Optimized image 324 is as before "compared" with the ideal label optimized image 524 by a training engine 505. Training engine 505 computes the deviation of the optimized image 324 from labeled optimized image 524, and based on that deviation, computes improved parameters for the MLEs 504 and 514. MLE 514 may then generate improved rendering control parameters 506. As before, this process iterates until the deviation computed by training engine 505 is less than some desired tolerance, at which time the optimized images 324 that result from the rendering control parameters 506 are close to the "ideal" labeled optimized images 524.

In one embodiment of this process, MLE 514 could be trained in a system with an already trained MLE 504. In another, MLE 504 could be trained in a system with an already trained MLE 514. In yet another, MLE 504 and MLE 514 could be trained together at the same time. As with MLE 404, MLEs 504 and 514 may be trained in situ in the Digital Camera 302, trained offline on a Computer System 100 or Parallel Processing Subsystem 112 and then implemented in the Digital Camera 302, or trained on an ongoing basis on a computing system located remotely, i.e. a cloud-based computing system. By implementing the techniques described above, the quality of output images rendered by digital camera 302 may be significantly improved.

In one embodiment, the labeled optimized images 524 are generated manually, i.e. by collecting human-generated ratings of images produced by alternative rendering control parameters 506. In another embodiment, MLE 504 and/or MLE 514 may be trained on an ongoing basis by receiving input from a user of digital camera 302 that represents the perceived quality of an optimized image 324 generated using given set of rendering control parameters 506. By repeating this process for different rendering control parameters for different raw images, training engine 505 may adjust the weight values associated with MLEs 504 and/or 514 to better choose the rendering algorithm selectors 506a and rendering algorithm arguments 506b. In this fashion, MLE 514 may be trained to predict the preferences of a user.

By implementing the techniques described above, the quality of optimized images rendered by digital camera 302 may be significantly improved.

Persons skilled in the art will recognize that a wide variety of machine learning algorithms and associated training techniques may be applied in order to implement each of MLEs 404, 504, and 514. Further, the different embodiments of IOE 322 described above in conjunction with FIGS. 3-5 may be combined in any technically feasible fashion. Each of those different embodiments is described in greater detail below in conjunction with FIGS. 7-10.

Figure 6:
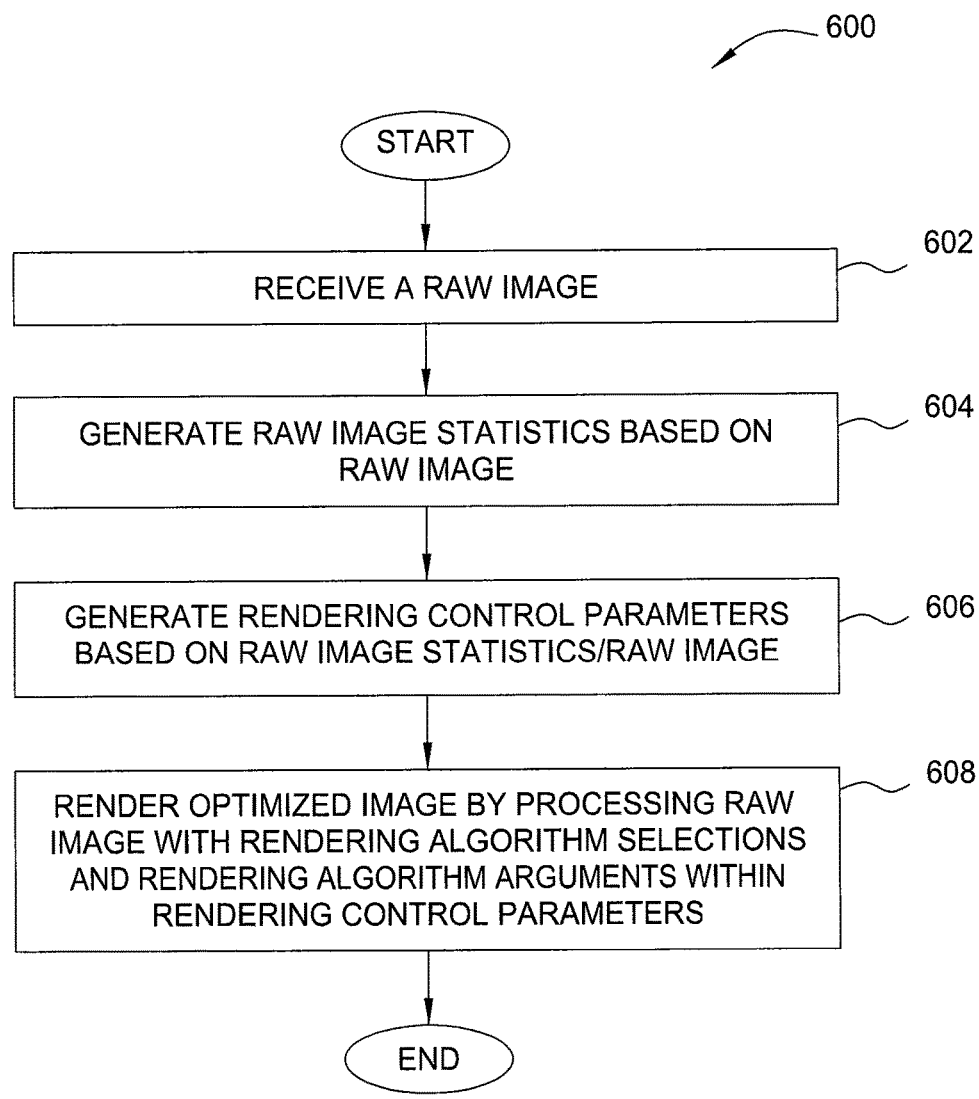
FIG. 6 is a flowchart of method steps for processing a digital image using the image optimization engine of FIGS. 4A and 4B, according to one embodiment of the present invention.

FIG. 6 if a flowchart of method steps for processing a digital image using IOE 322 shown in FIGS. 4A-4B, according to one embodiment of the present invention. Although the method steps are described in conjunction with the systems of FIGS. 1-4B, persons skilled in the art will understand that any system configured to perform the method steps, in any order, is within the scope of the present invention.

As shown, a method 600 starts at step 602, where IOE 322 receives a raw image. The raw image may be captured by, e.g., optical sensor 308 within digital camera 302 shown in FIG. 3. At step 604, IOE 322 generates raw image statistics for the raw image. The raw image statistics generated by IOE 322 may include different values, where each value corresponds to a different statistic that may be computed for a raw image. The raw image statistics may include a wide variety of different statistics, including quantities that represent color distribution, luminance distribution, contrast, saturation, exposure, and/or other statistics associated with images.

At step 606, IOE 322 generates rendering control parameters based upon the raw image statistics and based optionally as well on the raw image using MLE 404. The rendering control parameters select the algorithms to be applied to the raw image as well as the arguments to be given to those algorithms. As described above in conjunction with FIG. 4A, MLE 404 may be trained by applying any technically feasible supervised learning algorithm, as described in conjunction with FIG. 4B.

Figure 7:
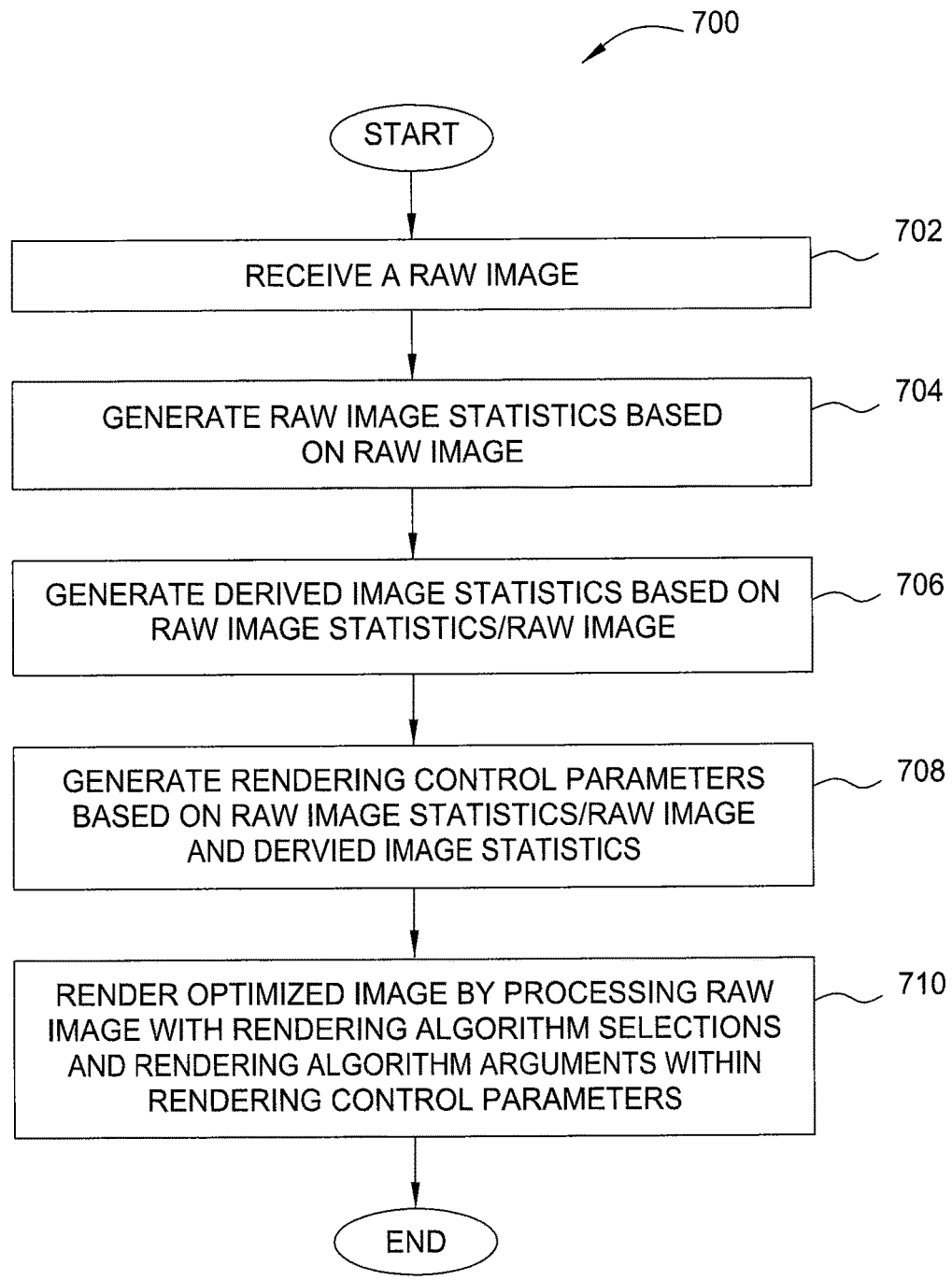
FIG. 7 is a flowchart of method steps for processing a digital image using the image optimization engine of FIGS. 5A and 5B, according to one embodiment of the present invention.

At step 608, IOE 322 renders an optimized image by processing the raw image with the selected algorithms and their arguments. The method 600 then ends. By implementing the method 600, IOE 322 may generate optimized images having improved quality compared to raw images. FIG. 7 outlines another approach for generating optimized images.

FIG. 7 is a flowchart of method steps for processing a digital image using IOE 322 shown in FIGS. 5A-5B, according to one embodiment of the present invention. Although the method steps are described in conjunction with the systems of FIGS. 1-3 and 5A, persons skilled in the art will understand that any system configured to perform the method steps, in any order, is within the scope of the present invention.

As shown, a method 700 begins at step 702, where IOE 322 receives a raw image. At step 704, IOE 322 generates raw image statistics for the raw image. Steps 702 and 704 may be substantially similar to steps 602 and 604, respectively, of the method 700 shown in FIG. 6.

At step 706, IOE 322 generates derived image statistics for the raw image based on the raw image statistics and optionally also based on the raw image. The derived image statistics represent statistics that may be inferred based on the raw image statistics, and may represent qualities of a raw image, such as type of scene (e.g. "beach," "forest," etc.), color of illuminant, depth of focus, and so forth. In general, the derived image statistics represent properties of the external environment. As described above in conjunction with FIG. 5A, IOE 322 implements MLE 504 in order to generate the derived image statistics. As also described above, MLE 504 may be trained by applying any technically feasible supervised learning algorithm to MLE 504 in order to adjust weight values within MLE 504. In doing so, a system comprising MLE 504 may be trained using "example" raw images in combination with their corresponding "ideal" labeled optimized images.

At step 708, IOE 322 generates rendering control parameters based upon the derived statistics and optionally based also on the raw image statistics and optionally the full or partial raw image using MLE 514. The rendering control parameters select the algorithms to be applied to the raw image as well as the arguments to be given to those algorithms. As with MLE 504, MLE 514 may be trained by applying any technically feasible supervised learning algorithm, as described in conjunction with FIG. 5B.

Figure 8:
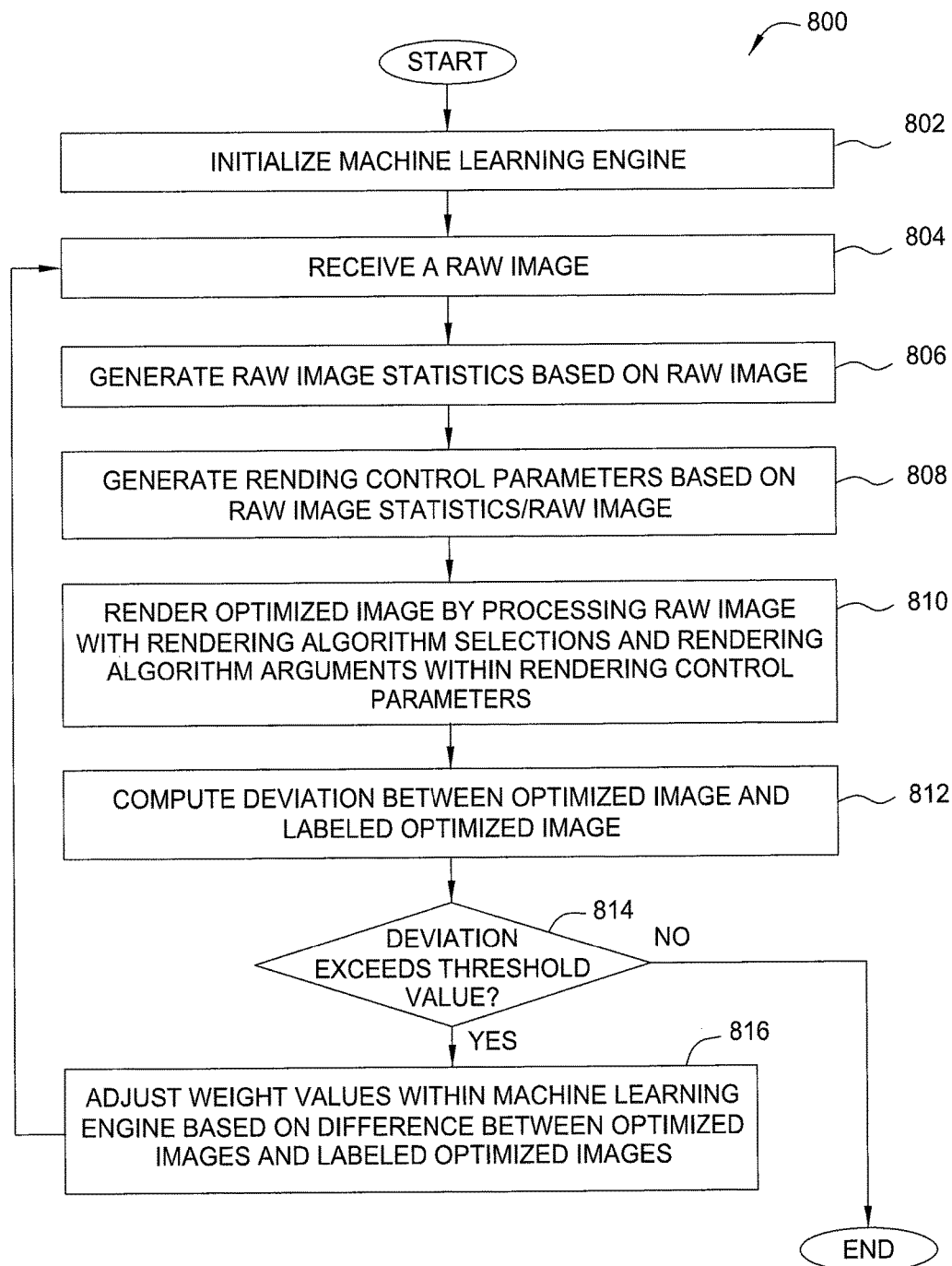
FIG. 8 is a flowchart of method steps for training the image optimization engine of FIGS. 4A and 4B, according to one embodiment of the present invention.
Figure 9:
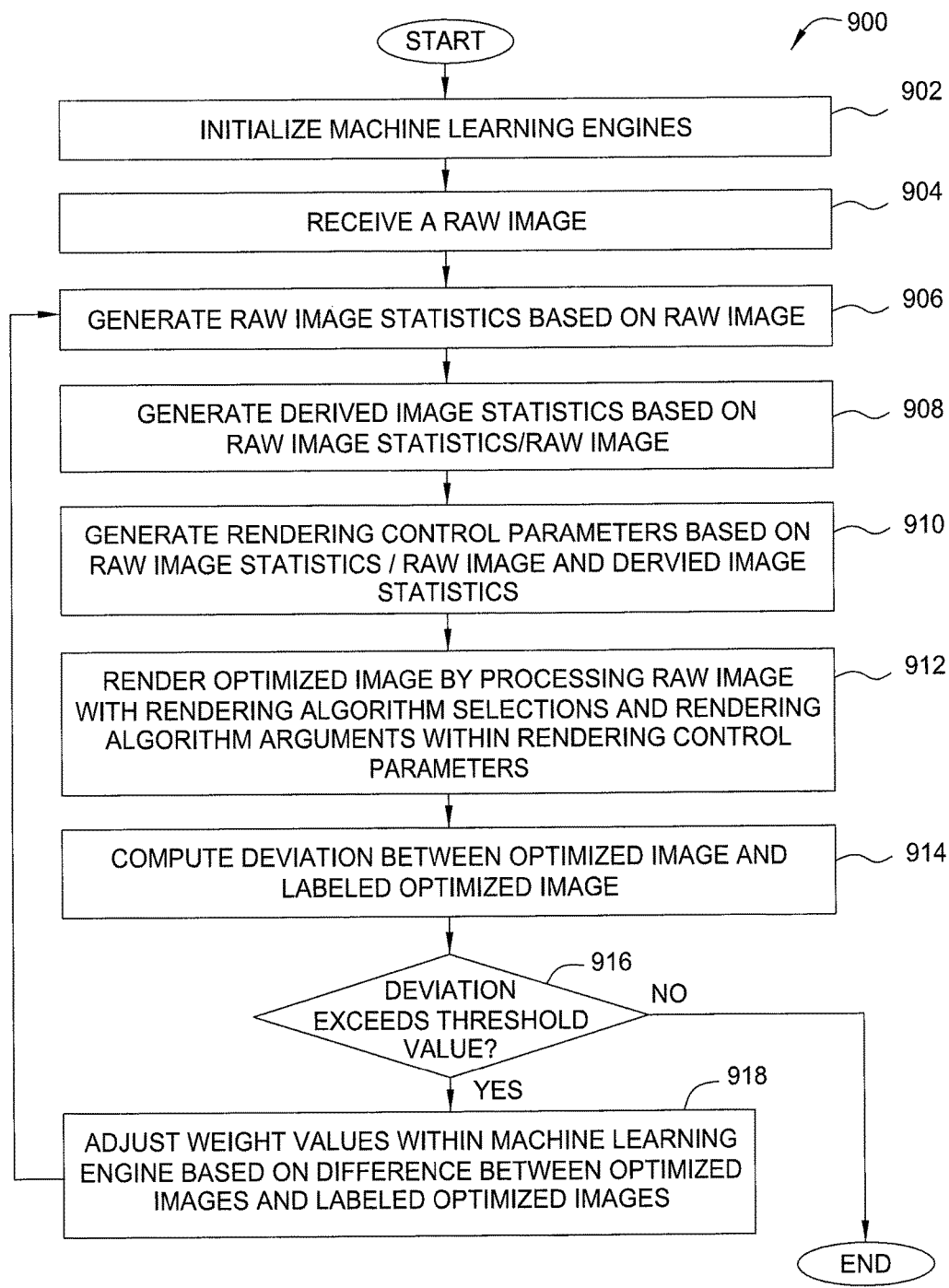
FIG. 9 is a flowchart of method steps for training the image optimization engine of FIGS. 5A and 5B, according to one embodiment of the present invention.

At step 710, IOE 322 applies the selected algorithms with specified arguments to the raw image in order to render an optimized image. The method 700 then ends. By implementing the method 700, IOE 322 may generate optimized images having improved quality compared to raw images. FIGS. 8 and 9 outline two embodiments of methods for training MLE 404, 504, and 514.

FIG. 8 is a flowchart of method steps for training IOE 322 shown in FIGS. 4A-4B, according to one embodiment of the present invention. Although the method steps are described in conjunction with the systems of FIGS. 1-4B, persons skilled in the art will understand that any system configured to perform the method steps, in any order, is within the scope of the present invention.

As shown, the method 800 begins at step 802, where training engine 405 within IOE 322 initializes MLE 404. Training engine 405 may initialize MLE 404 with a collection of values that may be random or more carefully selected in a way consistent with the state of the art of Machine Learning.

At step 804, IOE 322 receives a raw image. The raw image may be captured by, e.g., optical sensor 308 within digital camera 302 shown in FIG. 3. At step 806, IOE 322 generates raw image statistics for the raw image. The raw image statistics may include different values, where each value corresponds to a different statistic that may be computed for a raw image. The raw image statistics may include a wide variety of different statistics, including quantities that represent color distribution, luminance distribution, contrast, saturation, exposure, and/or other statistics associated with images.

At step 808, MLE 404 within IOE 322 generates rendering control parameters based upon the raw image statistics and based optionally as well on the raw image. The rendering control parameters select the algorithms to be applied to the raw image as well as the arguments to be given to those algorithms. At step 810, IOE 322 renders an optimized image by processing the raw image with the rendering algorithm selections and rendering algorithm arguments within rendering control parameters.

At step 812, training engine 405 computes the deviation between the optimized image and a labeled optimized image. The labeled optimized image may be generated manually, i.e. by collecting human-generated ratings of images produced by rendering control parameters. At step 814, training engine 405 determines whether the deviation computed at step 812 exceeds a threshold. If so, then training engine 405 adjusts the weight values within MLE 404 based on the difference between the optimized image and the labeled optimized image and the method 800 then returns to step 804 and proceeds as described above. The adjusted values may then be used by MLE 404 to compute improved rendering control parameters. If at step 814 training engine 405 determines that the deviation falls beneath the threshold, the method 800 ends.

FIG. 9 is a flowchart of method steps for training IOE 322 shown in FIGS. 5A-5B, according to one embodiment of the present invention. Although the method steps are described in conjunction with the systems of FIGS. 1-3 and 5A-5B, persons skilled in the art will understand that any system configured to perform the method steps, in any order, is within the scope of the present invention.

As shown, the method 900 begins at step 902, where training engine 505 within IOE 322 initializes MLEs 504 and 514. Training engine 505 may initialize MLEs 504 and 514 with a collection of values that may be random or more carefully selected in a way consistent with the state of the art of Machine Learning.

At step 904, IOE 322 receives a raw image. The raw image may be captured by, e.g., optical sensor 308 within digital camera 302 shown in FIG. 3. At step 906, IOE 322 generates raw image statistics for the raw image. The raw image statistics may include different values, where each value corresponds to a different statistic that may be computed for a raw image. The raw image statistics may include a wide variety of different statistics, including quantities that represent color distribution, luminance distribution, contrast, saturation, exposure, and/or other statistics associated with images. At step 908, MLE 514 within IOE 322 generates derived image statistics based on the raw image statistics. The derived image statistics represent statistics that may be inferred based on the raw image statistics, and may represent qualities of a raw image, such as type of scene (e.g. "beach," "forest," etc.), depth of focus, and so forth. In general, derived image statistics represent properties of the external environment.

At step 910, MLE 514 within IOE 322 generates rendering control parameters based upon the raw image statistics and derived image statistics and based optionally as well on the raw image. The rendering control parameters select the algorithms to be applied to the raw image as well as the arguments to be given to those algorithms. At step 912, IOE 322 renders an optimized image by processing the raw image with the rendering algorithm selections and rendering algorithm arguments within rendering control parameters.

At step 914, training engine 505 computes the deviation between the optimized image and a labeled optimized image. The labeled optimized image may be generated manually, i.e. by collecting human-generated ratings of images produced by rendering control parameters. At step 916, training engine 505 determines whether the deviation computed at step 914 exceeds a threshold. If so, then training engine 505 adjusts the weight values within MLEs 504 and 514 based on the difference between the optimized image and the labeled optimized image. This adjustment could occur simultaneously, training engine 504 could adjust weight values within MLEs 504 and 514 during different training cycles involving different raw images. The adjusted values may then be used by MLEs 504 and 514 to compute improved rendering control parameters. The method 900 then returns to step 904 and proceeds as described above. If at step 916 training engine 505 determines that the deviation falls beneath the threshold, the method 900 ends.

Persons skilled in the art will recognize that the techniques described above in conjunction with FIGS. 3-9 may be combined in any technically feasible fashion. For example, MLEs 404, 504, and 514, may all be incorporated into IOE 322 and implemented as part of an image processing pipeline configured to generate optimized images from raw images. Further, the MLEs described herein may be trained initially before the digital camera 302 is released to the market, and may also be subject to ongoing training based on user input.

In sum, a digital camera includes an image optimization engine configured to generate an optimized image based on a raw image captured by the digital camera. The image optimization engine implements one or more machine learning engines in order to select rendering algorithms and provide them arguments in order to render an optimized image from the raw image. The image optimization engine is configured to generate the optimized image by processing the raw image with the selected algorithms and corresponding arguments.

Advantageously, the machine learning engine within the image optimization engine may be trained to generate images without requiring a team of image processing algorithm designers to produce a collection of algorithms tuning such algorithms. Further, the user of the digital camera is no longer required to provide substantial manual input to the digital camera regarding qualities of the external environment, thereby improving user experience.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for rendering an optimized image, comprising:
capturing a raw image via an optical sensor included in a digital camera;
processing the raw image to generate raw image statistics related to the raw image, wherein the raw image statistics comprise a plurality of values, each value corresponding to a different statistic that can be computed for an image;
causing a first machine learning engine to generate derived image statistics for the raw image based on the raw image statistics, wherein the derived image statistics comprise qualities of the raw image;
causing a second machine learning engine to generate a set of rendering control parameters based on the raw image statistics and the derived image statistics, wherein the rendering control parameters select a rendering algorithm and a set of rendering algorithm arguments that correspond to the selected rendering algorithm; and
rendering the optimized image by processing the raw image with the rendering algorithm and the set of rendering algorithm arguments.

2. The computer-implemented method of claim 1, wherein the second machine learning engine is trained by:
receiving a target image;
computing a deviation value by comparing the image to the target image;
determining that the deviation value exceeds a threshold value; and
adjusting a set of weight values within the second machine learning engine based on differences between pixel values associated with the image and the target image.

3. The computer-implemented method of claim 2, wherein the second machine learning engine comprises an artificial neural network and wherein adjusting the set of weight values associated with the second machine learning engine comprises applying a back-propagation learning algorithm to the set of weight values.

4. The computer-implemented method of claim 1, wherein the raw image statistics represent a degree of white balance, contrast, saturation, or exposure associated with the raw image.

5. The computer-implemented method of claim 1, wherein the first and second machine learning engines are trained by:
receiving a target image;
computing a deviation value by comparing the image to the target image;
determining that the deviation value exceeds a threshold value;
adjusting a set of weight values within the second machine learning engine based on differences between pixel values associated with the image and the target image; and
adjusting a set of weight values within the first machine learning engine based on differences between pixel values associated with the image and the target image.

6. The computer-implemented method of claim 5, wherein the second machine learning engine comprises an artificial neural network and adjusting the set of weight values associated with the second machine learning engine comprises applying a back-propagation learning algorithm to the set of weight values, and wherein the first machine learning engine comprises an artificial neural network and adjusting the set of weight values associated with the first machine learning engine comprises applying a back-propagation learning algorithm to the set of weight values.

7. The computer-implemented method of claim 1, wherein the second machine learning engine selects the rendering algorithm from within a plurality of different rendering engines.

8. The computer-implemented method of claim 1, wherein the second machine learning engine is trained on an ongoing basis within a cloud computing system based on input received from a user of the digital camera.

9. The computer-implemented method of claim 1, wherein the rendering algorithm arguments are included within rendering control parameters that also include rendering algorithm selectors, wherein the rendering algorithm is selected based on a rendering algorithm selector corresponding to the rendering algorithm.

10. The computer-implemented method of claim 9, wherein the rendering algorithm selector comprises a value generated by the second machine learning.

11. The computer-implemented method of claim 1, wherein the derived image statistics generated by the first machine learning engine are further based on an optimized image that corresponds to the raw image and is provided to the first machine learning engine.

12. The computer-implemented method of claim 11, wherein generating the set of image statistics, causing the second machine learning engine to select the rendering algorithm, and rendering the image are performed iteratively to generate a plurality of optimized images, and the optimized image comprises one of the plurality of optimized images.

13. The computer-implemented method of claim 1, wherein the raw image statistics include at least one of a color distribution, a luminance distribution, a contrast, a saturation, and an exposure.

14. The computer-implemented method of claim 1, wherein the derived image statistics include at least one of a type of scene and a depth of focus.

15. A non-transitory computer-readable medium storing program instructions that, when executed by a processing unit, cause the processing unit to render an optimized image by performing the steps of:
capturing a raw image via an optical sensor included in a digital camera;
processing the raw image to generate raw image statistics related to the raw image, wherein the raw image statistics comprise a plurality of values, each value corresponding to a different statistic that can be computed for an image;

causing a first machine learning engine to generate derived image statistics for the raw image based on the raw image statistics, wherein the derived image statistics comprise qualities of the raw image;

causing a second machine learning engine to generate a set of render control parameters based on the raw image statistics and the derived image statistics, wherein the rendering control parameters select a rendering algorithm and a set of rendering algorithm arguments that correspond to the selected rendering algorithm; and rendering the optimized image by processing the raw image with the rendering algorithm and the set of rendering algorithm arguments.

16. The non-transitory computer-readable medium of claim 15, wherein the second machine learning engine is trained by:
receiving a target image;
computing a deviation value by comparing the image to the target image;
determining that the deviation value exceeds a threshold value; and
adjusting a set of weight values within the second machine learning engine based on differences between pixel values associated with the image and the target image.

17. The non-transitory computer-readable medium of claim 16, wherein the second machine learning engine comprises an artificial neural network and wherein adjusting the set of weight values associated with the second machine learning engine comprises applying a back-propagation learning algorithm to the set of weight values.

18. The non-transitory computer-readable medium of claim 15, wherein the raw image statistics represent a degree of white balance, contrast, saturation, or exposure associated with the raw image.

19. The non-transitory computer-readable medium of claim 15, wherein the first and second machine learning engines are trained by:
receiving a target image;
computing a deviation value by comparing the image to the target image;
determining that the deviation value exceeds a threshold value;
adjusting a set of weight values within the second machine learning engine based on differences between pixel values associated with the image and the target image; and
adjusting a set of weight values within the first machine learning engine based on differences between pixel values associated with the image and the target image.

20. The non-transitory computer-readable medium of claim 19, wherein the second machine learning engine comprises an artificial neural network and adjusting the set of weight values associated with the second machine learning engine comprises applying a back-propagation learning algorithm to the set of weight values, and wherein the first machine learning engine comprises an artificial neural network and adjusting the set of weight values associated with the first machine learning engine comprises applying a back-propagation learning algorithm to the set of weight values.

21. A computing device configured to render an optimized image, including:
a processing unit configured to:
capture a raw image via an optical sensor included in a digital camera,
process the raw image to generate raw image statistics related to the raw image, wherein the raw image statistics comprise a plurality of values, each value corresponding to a different statistic that can be computed for an image,
cause a first machine learning engine to generate derived image statistics for the raw image based on the raw image statistics, wherein the derived image statistics comprise qualities of the raw image,
cause a second machine learning engine to generate a set of rendering control parameters based on the raw image statistics and the derived image statistics, wherein the rendering control parameters select a rendering algorithm and a set of rendering algorithm arguments that correspond to the selected rendering algorithm, and
render the optimized image by processing the raw image with the rendering algorithm and the set of rendering algorithm arguments.

22. The computing device of claim 21, further including:
a memory coupled to the processing unit and storing program instructions that, when executed by the processing unit, cause the processing unit to:
capture the raw image,
generate the set of image statistics,
cause the second machine learning engine to select the rendering algorithm and the set of rendering algorithm arguments, and
render the image.

23. The computing device of claim 21, wherein the second machine learning engine is trained by:
receiving a target image;
computing a deviation value by comparing the image to the target image;
determining that the deviation value exceeds a threshold value; and
adjusting a set of weight values within the second machine learning engine based on differences between pixel values associated with the image and the target image, wherein the second machine learning engine comprises an artificial neural network and wherein adjusting the set of weight values associated with the second machine learning engine comprises applying a back-propagation learning algorithm to the set of weight values.

24. The computing device of claim 21, wherein the raw image statistics represent a degree of white balance, contrast, saturation, or exposure associated with the raw image.

25. The computing device of claim 21, wherein the first and second machine learning engines are trained by:
receiving a target image;
computing a deviation value by comparing the image to the target image;
determining that the deviation value exceeds a threshold value;
adjusting a set of weight values within the second machine learning engine based on differences between pixel values associated with the image and the target image; and
adjusting a set of weight values within the first machine learning engine based on differences between pixel values associated with the image and the target image, wherein the second machine learning engine comprises an artificial neural network and adjusting the set of weight values associated with the second machine learning engine comprises applying a back-propagation learning algorithm to the set of weight values, and wherein the first machine learning engine comprises an artificial neural network and adjusting the set of weight values associated with the first machine learning engine comprises applying a back-propagation learning algorithm to the set of weight value.

* * * * *

UNITED STATES PATENT AND TRADEMARK OFFICE
CERTIFICATE OF CORRECTION

PATENT NO. : 9,741,098 B2
APPLICATION NO. : 13/651342
DATED : August 22, 2017
INVENTOR(S) : Michael Brian Cox Page 1 of 1

It is certified that error appears in the above-identified patent and that said Letters Patent is hereby corrected as shown below:

In the Claims

Column 17, Claim 15, Line 6, delete "render" and insert --rendering--;

Column 19, Claim 25, Line 5, delete "value" and insert --values--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*